US012141636B2

(12) United States Patent
Schwar et al.

(10) Patent No.: US 12,141,636 B2
(45) Date of Patent: Nov. 12, 2024

(54) RFID TAG IC WITH STANDARD-ADAPTED COUNTER INCREMENT, AND RFID COMMUNICATION SYSTEM

(71) Applicant: NXP B.V., Eindhoven (NL)

(72) Inventors: Christian Schwar, Graz (AT); Christian Weidinger, Graz (AT); Franz Amtmann, Graz (AT); Heinz Umfahrer, Graz (AT); Christoph Hans Joachim Garbe, Neu Wulmstorf (DE); Thomas Pichler, Graz (AT)

(73) Assignee: NXP B.V., Eindhoven (NL)

( * ) Notice: Subject to any disclaimer, the term of this patent is extended or adjusted under 35 U.S.C. 154(b) by 426 days.

(21) Appl. No.: 17/655,113

(22) Filed: Mar. 16, 2022

(65) Prior Publication Data

US 2022/0327341 A1 Oct. 13, 2022

(30) Foreign Application Priority Data

Apr. 13, 2021 (EP) ..................................... 21168131

(51) Int. Cl.
*G06K 19/077* (2006.01)
*G06K 7/10* (2006.01)
(Continued)

(52) U.S. Cl.
CPC ....... *G06K 19/077* (2013.01); *G06K 7/10297* (2013.01); *G06K 7/10346* (2013.01); *H04W 4/80* (2018.02)

(58) Field of Classification Search
CPC .................................................... G06K 19/077
See application file for complete search history.

(56) References Cited

U.S. PATENT DOCUMENTS 8,537,907 B2 * 9/2013 Sung ...................... H04L 69/18
455/39
9,312,921 B2 * 4/2016 Nambord ................. H01Q 7/00
(Continued)

FOREIGN PATENT DOCUMENTS

EP 2487629 A1 8/2012
EP 2913973 A1 9/2015
(Continued)

OTHER PUBLICATIONS

STMicroelectronics; "ST25TV02K/ST25TV512 Nfc Type 5 / RFID tag IC with EEPROM up to 2-Kbit, product identification and protection" Datasheet; Jun. 14, 2018.
(Continued)

*Primary Examiner* — Joseph H Feild
*Assistant Examiner* — Pameshanand Mahase

(57) ABSTRACT

There is described an RFID tag IC, comprising:
i) an NFC interface configured to initiate a power-up, when coupled with an HF field, and receive a read command from an RFID device;
ii) a non-volatile memory, wherein the non-volatile memory is configured to store a counter value; and
iii) a processing unit configured to increment the counter value when coupled with the HF field, set an increment flag, when the increment is successful, and thereby block a further increment of the counter value, in particular when fulfilling the read command, and reset the increment flag after fulfilling the read command. Further, a communication system and a method of operating are described.

16 Claims, 3 Drawing Sheets

(51) Int. Cl.
*G06Q 10/087* (2023.01)
*H04W 4/80* (2018.01)

(56) References Cited

U.S. PATENT DOCUMENTS

| | | | |
|---|---|---|---|
| 10,285,034 | B2 | 5/2019 | Lee et al. |
| 10,285,304 | B1* | 5/2019 | Lin .......................... G01F 1/76 |
| 2003/0137400 | A1 | 7/2003 | Heinrich et al. |
| 2019/0349352 | A1* | 11/2019 | Hoyer ................. H04L 63/0823 |
| 2020/0104844 | A1 | 4/2020 | Herrington |

FOREIGN PATENT DOCUMENTS

| | | |
|---|---|---|
| EP | 2958056 B1 | 2/2019 |
| EP | 3657405 A1 | 5/2020 |

OTHER PUBLICATIONS

ISO/IEC 14443-2:2020(E); "Cards and security devices for personal identification—Contactless proximity objects—Part 2: Radio frequency power and signal interface"; Fourth edition Jul. 2020.
ISO/IEC 14443-3:2018(E); "Cards and security devices for personal identification—Contactless proximity objects—Part 3: Initialization and anticollision"; Fourth edition Jul. 2018.
ISO/IEC 15693-2:2019(E); "Cards and security devices for personal identification—Contactless vicinity objects—Part 2: Air interface and initialization"; Third edition Apr. 2019.
ISO/IEC 15693-3:2019(E); "Cards and security devices for personal identification—Contactless vicinity objects—Part 3: Anticollision and transmission protocol"; Thurd edition Apr. 2019.

* cited by examiner

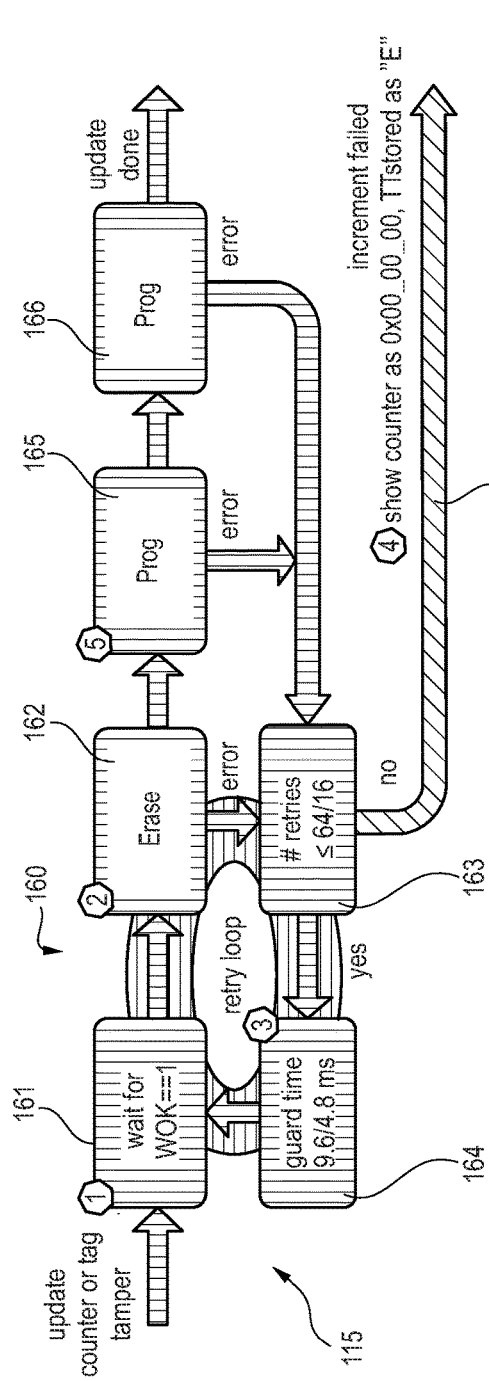

RFID TAG IC WITH STANDARD-ADAPTED COUNTER INCREMENT, AND RFID COMMUNICATION SYSTEM

CROSS-REFERENCE TO RELATED APPLICATIONS

This application claims priority under 35 U.S.C. § 119 to European Patent Application No. 21168131.7, filed on Apr. 13, 2021, the contents of which are incorporated by reference herein.

TECHNICAL FIELD

The present disclosure relates to an RFID tag IC with an NFC interface, a non-volatile memory that stores a counter value, and a processing unit. Further, the present disclosure relates to an RFID communication system that comprises the RFID IC tag and a further RFID device. Additionally, the present disclosure relates to a method of operating the communication system. The disclosure may hence relate to the technical field of RFID and NFC communication.

TECHNICAL BACKGROUND

Near field communication (NFC) is widely used in a variety of applications including, for example, smartphones, and similar devices including Radio Frequency Identification (RFID), to establish radio communication with each other by touching them together or bringing them into close proximity, for example within a short distance such as a few to several centimeters or inches. Applications include, among others, contactless transactions, data exchange, and simplified setup of more complex communications such as Wi-Fi or bluetooth. Various other types of communication applications include those between an RFID device such as an NFC-enabled mobile phone and another RFID device such as an NFC chip, called a "tag". Some of the applications involving identification products such as smart cards and RFID tags are used in endeavors such as transport (e.g., ticketing, road tolling, baggage tagging), finance (e.g., debit and credit cards, electronic purse, merchant card), communications (e.g., SIM card for GSM phone), and tracking (e.g., access control, inventory management, asset tracking).

The international standard ISO/IEC 14443 is the industry standard for contactless smart cards, and the communication protocols associated therewith. ISO 15693 is another relevant NFC Forum standard (in particular with respect to Tag Type 5). Standard-compliant products provide RF-communication technology for transmitting data between a card or tag and a reader device. For example, in electronic ticketing for public transport, travelers can wave a smart card over a reader at the turnstiles or entry point, benefiting from improved convenience and speed in the ticketing process. Such products can be important to individual mobility, and can support multiple applications such as road tolling, libraries, public transport, and access control.

In particular, small NFC devices such as RFID tags can be applied in a versatile and feasible manner for many applications. For example, an RFID tag can be attached to a poster (so-called smart poster) and a user can directly follow a link to a website of the provider of the poster by establishing an NFC contact between an RFID reader device and the (IC of the) RFID tag. Many other applications are possible, in which a user approaches a small RFID tag with his/her own RFID device (such as a mobile phone) and requests a service from the smaller RFID tag. Hereby, the RFID tag may receive a request for the service (e.g. a link to a website) and provide the link via an NFC connection to the RFID mobile phone, for example as an NDEF message.

The RFID tag (IC), for example attached to the smart poster, often comprises a counter being a simple processing unit that keeps a record of how many times a service has been requested from the RFID tag. This information may in particular be relevant for the service provider in order to judge if the service is economical. Furthermore, this information may also be of interest for a user of the service in order to judge if other persons use the service as well, wherein a large amount of requested services may indicate a quality criterion. Additionally, the counter may be used to detect a fraud, e.g. an unauthorized copy of the tag. For example, if the counter of the unauthorized copy comprises the same counter value as the original tag, a fraud event may be very probable.

Some NFC-enabled RFID tags compliant to T2T standard (tag type 2, based on ISO 14443) or T4T standard (tag type 4, based also on ISO 14443) automatically count the number of times they have been read. This number can then be used, e.g. by an RFID reader infrastructure, to create usage statistics or to track the history of a tag to help detecting fraud. State of the art T2T or T4T may store this counter value in a memory with backup management. This is done to ensure that the counter value is not lost, when the RFID tag is decoupled (removed) from the corresponding HF (high frequency) electromagnetic field during updating (incrementing) the counter value. This update typically takes a couple of milliseconds and is done in the time between a read command from the RFID device and a response from the RFID tag, which takes around 5 ms.

FIG. 3 shows a conventional example of an NFC tag coupled to an HF field of an NFC mobile device. The NFC reader sends a read command to the NFC tag. Until the NFC tag responds, there is a time slot of around 20 ms. This time slot may be more than sufficient to update a counter value.

T5T standard NFC tags (tag type 5, based on ISO 15693) are technically and economically on the rise and may provide advantages such as a higher read range, smaller form factors, and an additional usability for logistics. However, the T5T standard specification only allows for a time of 0.3 ms between the read command of the RFID device and the response of the RFID tag. As a consequence, there is no update (increment) of the counter value possible in this time slot anymore. T5T does therefore not offer sufficient time to increment a counter value with backup management in the time between read command and response. The same may hold true for other RFID standards that do not allow a program/erase step (for incrementing a counter value) of a non-volatile tag memory during read command/reply message.

OBJECT AND SUMMARY

There may be a need to provide an RFID tag IC, wherein the counter value can be incremented in an efficient and stable manner, even though a standard with short time slots is applied.

An RFID tag IC, an RFID communication system, a smart product, and a method of operating an RFID communication system according to the independent claims are provided.

According to an aspect of the present disclosure, an RFID tag (IC) is described, comprising:
i) an NFC interface configured to
   a) initiate a power-up (start-up), when coupled with an HF (high-frequency) field (e.g. when the HF field is switched on or entered), and
   b) receive a read command from an RFID device (e.g. an NFC phone or an RFID reader),
ii) a non-volatile memory, wherein the non-volatile memory is configured to store a counter value, and
iii) a processing unit configured to
   a) increment (update) the counter value when coupled with the HF field,
   b) set an increment flag (e.g. a non-volatile bit), when the increment is successful (and not set the increment flag, when the increment is not successful), and thereby block a further increment of the counter value (in particular when/during fulfilling the read command), and
   c) reset the increment flag after fulfilling the read command (e.g. before replying to the read command).

According to a further aspect of the present disclosure, an RFID communication system is described, comprising:
i) an RFID tag IC as described above, and
ii) the RFID device (in particular an NFC device or an RFID reader) configured to switch on the HF field and to send the read command to the RFID tag IC.

According to a further aspect of the present disclosure, a service providing unit (in particular a smart product such as a smart poster) comprising the RFID tag IC is described.

According to a further aspect of the present disclosure, a method of managing an RFID communication system including an RFID tag IC and an RFID device is described, the method comprising:
i) coupling the RFID tag IC with an HF field (switching on or entering the HF field) of the RFID device, and subsequently
ii) initiating a power-up of the RFID tag IC,
iii) receiving a read command from the RFID device at the RFID tag IC,
iv) incrementing a counter value stored in a non-volatile memory of the RFID tag, when coupled (powered-up) to the HF field,
v) setting an increment flag, when the incrementing is successful, and thereby blocking a further increment of the counter value,
vi) fulfilling the read command, and (at the same time or) subsequently
vii) resetting the increment flag.

In the context of the present application, the term "NFC" may refer to Near Field Communication which may be a short-range wireless technology (distances measured in centimeters) that is optimized for intuitive, easy, and secure communications between various devices without user configuration. In order to make two NFC devices communicate, users may bring them close together or even make them touch. The devices' NFC interfaces may automatically connect and configure themselves to form a peer-to-peer network. NFC may also bootstrap with other protocols, such as Bluetooth or Wireless Ethernet (WiFi), by exchanging configuration and session data. NFC may be compatible with contactless smart card platforms. NFC devices can also operate like a contactless card making them compatible with the huge installed infrastructure of ISO 14443- or ISO 15693-compliant systems. In the context of the present application, the term "NFC device" may refer to any device that has an NFC functionality as described above. An NFC interface may for example be implemented in a tag, a smart card, or a mobile phone.

In the context of the present application, the term "memory" may refer to every electronic that is suitable for storing information. The memory may be the memory of an NFC tag and may be a non-volatile EEPROM. There may be one memory separated into units or different memories may be connected or coupled to each other.

According to an embodiment, the present disclosure may be based on the idea that an RFID tag IC, wherein the counter value can be incremented in an efficient and stable manner, even though an (advanced) standard (e.g. ISO 15693, NFC T5T) with short time slots (e.g. 320 µs) is applied, can be provided, when the increment of the counter value is shifted to the time of a power-up that is initiated, when the RFID tag IC couples with an HF field (in particular when the HF field is switched on or entered). Said power-up time may be sufficiently long (e.g. 5 ms) to enable an increment of the counter value. This increment may be done in particular using an increment flag that has the status "off", when the power-up is initiated. After a successful increment during power-up time, the increment flag is set to "on", which blocks further increments of the counter value. Then, after the power-up, an RFID device (coupled to the RFID tag IC via the HF field), may send a read command to the RFID tag IC which command may be followed by a fulfill of the read command and a reply message from the RFID tag IC to the RFID device. Only after the described RFID communication, the increment flag may be reset to "off", so that a new increment of the counter value can be performed, when a further power-up with an HF field is initiated. Furthermore, an erase step of an old counter value (before actually incrementing the counter value) may be applied to make sure that the power provided from the HF field is sufficient for operation. This may in particular become important during long range communications (several centimeters) between RFID tag IC and RFID device, when the RFID tag IC enters the HF field slowly.

In an embodiment, the RFID tag IC is configured according to an (NFC) standard that does not allow an increment of the counter value during fulfilling a read command (and a subsequent reply message).

In an embodiment, the RFID tag IC is configured according to the ISO15693 standard. Thereby, the IC (and the RFID communication system) is (are) configured according to a potentially highly relevant standard for present and future applications. ISO/IEC 15693 is an ISO standard for vicinity cards which can normally be read out by a reader without being powered themselves, as the reader will supply the necessary power to the card in a wireless manner. ISO 15693 systems operate at the 13.56 MHz frequency and offer a short range communication (read) distance (in the millimeter range) or long communication distance (in the centimeter range). Specific applications may include libraries, ski passes, and public transportation.

In a further embodiment, the RFID tag IC is configured according to the NFC T5T standard. Also in this case, the IC (and the RFID communication system) is (are) configured according to a potentially highly relevant standard for present and future applications. Tag type 5 is a tag configuration that is based on ISO 15693, while tag type 2 (T2T) and tag type 4 (T4) are based on ISO 14443. T5T may provide advantages regarding the read range, the form factor and usability for logistics. However, some time slots of T5T are very short in comparison to T2T and T4T. For example, the time between a read command and a reply may be only 320.9 μs for T5T, while it is 5 ms for T2T and T4T. While the ISO 15693 standard configurations comprise a power-up time of only 1 ms, the (NFC) T5T configuration may comprise a power-up time of around 5 ms.

In a further embodiment, a time slot between receiving the read command and transmitting a reply message to the NFC device is less than 1 ms, in particular 320.9 μs. This requirement is fulfilled e.g. by the T5T standard discussed above. Hereby, even though a rapid operation time is provided, said time slot may be too short for incrementing the counter value. Accordingly, it may be necessary, to increment the counter in the power-up time.

In a further embodiment, the available power-up time for the RFID tag IC is 5 ms or more. Thus, the power-up time slot may be sufficient for incrementing the counter value (which may take several milliseconds) in an efficient and robust manner. The available power-up time may be measured from the rising edge of the HF field envelope to the falling edge of the first ASK modulation of the first command.

In a further embodiment, the increment flag is a persistence bit or a non-volatile bit. The increment flag may thus be implemented in an efficient and reliable manner without introducing additional measures. In the present document, the term "persistence bit" may in particular denote a bit which stores a binary value for a limited time without being supplied with power (milliseconds to hours). The term "non-volatile bit" may in contrary refer to a bit that stores a binary information for at least several years. The persistence bit or non-volatile bit may be set ("on" status), when an increment of the counter is successful. This measure may hinder a further increment of the counter value during the next power up. After a read command of the user memory and a reply the persistence bit or non-volatile bit may be reset ("off status") in order to be set again when, after a further power-up event, the counter value has been successfully incremented again. In a specific embodiment, a set persistence/non-volatile flag may hinder another increment before an NDEF message is read from the (user) memory (e.g. an RFID tag has been tapped by an RFID device). From the outside this may look like if the counter value would be incremented with the read access.

In a further embodiment, the processing unit is further configured to decide whether available power from the HF-field is sufficient for incrementing the counter value or not. The RFID tag IC may be dependent on the power provided by the HF-field and, if power is not sufficient, an ongoing operation may retard or fail. In order to decide if the power is sufficient, an erase step from a counter value incrementation may be applied. In particular, the erase step may require more power than subsequent increment (program) steps that write to the memory. Thus, if power is sufficient for the erase step, it may be concluded that there is also enough power for the subsequent increment steps. Further, it may produce less endurance stress to the non-volatile memory if the erase step fails (due to insufficient power supply) than, if the increment steps fail. The described approach may avoid the need for a current sink to probe whether enough power is available. Such a current sink may need to sink more current than the non-volatile memory needs and thereby additionally increase the minimum power needed by the RFID tag IC.

In a further embodiment, the processing unit is further configured to, in case available power from the HF field is not sufficient to increment the counter value, retry incrementing the counter value. In an embodiment, it may be specifically advantageous to use erase only accesses in the retry to avoid endurance stress. The retries may be organized as a retry loop that, after a guard time, launches a further attempt. A high number of retries may reduce the retry guard time which reduces latency once power is sufficient (but may increase stress on the memory). Providing a longer retry period may lead to a slower speed that can be supported at entering the HF field (but a longer time is needed until the IC can react to the read command). A high retry guard time may enable to reach high retry periods (but produces higher latency). As a consequence, the retry loop may be organized in a specific manner that takes into account the discussed parameters, depending on the applied system and the desired outcome.

In a further embodiment, a first access to the non-volatile memory step (in particular an erase step of an old counter value) of a multiple-step access to the non-volatile memory requires more power than the subsequent access to the non-volatile memory step (in particular an increment step of the counter value). As discussed above, if power is sufficient for the erase step, it may be concluded that there is also enough power for the subsequent increment steps.

In a further embodiment, the processing unit is further configured to, if the first access to the non-volatile memory step is not successful, retry after a guard time until a maximum number of retries is reached. Additionally or alternatively, the processing unit is further configured to, if the first access to the non-volatile memory step is successful, start the subsequent access to the non-volatile memory step.

In a further embodiment, the processing unit is further configured to: perform a retry loop, including using a static or a progressive guard time, when the increment of the counter value is not successful due to insufficient available power from the HF field. When the speed of entering the HF field is fast, using short guard times may reduce the latency. If the speed of entering the HF field is slow, using long guard times may prevent the non-volatile memory from stress. The guard time can be implemented static or progressive, wherein, for a static guard time, a compromise has to be selected, while a progressive guard time may enable an automatic adaption to the situation. In an example, the term "progressive guard time" may describe the circumstance that the guard time is getting larger with the number of retries, e.g. doubling each time or after a fixed number of times.

In a further embodiment, the processing unit is configured to inform the NFC device (in a suitable way) that all retries have failed and that the increment of the counter value has not been successful. In a further embodiment, the processing unit is configured to stop any further operation in case all retries have failed and the incrementing the counter was not successful.

In a further embodiment of the communication system, the RFID tag IC and the RFID device are in a long range communication (in particular several centimeter, more in particular ten centimeter or more). Additionally or alternatively, the communication system is configured for incrementing the counter value, when the HF field of the RFID device is on and the RFID tag IC is entering the HF field. Thereby, even though long range communication is applied, a power-up can directly start, when the RFID tag IC is coupled to the RFID device. Further, the RFID tag IC may decide (e.g. based on a erase step of the increment cycle) if the power provided from the HF field is sufficient for writing to the non-volatile memory (e.g. incrementing steps of the counter value).

In a further embodiment of the method, the RFID device is configured as an RFID reader, and the method further comprising:

i) approaching the RFID tag IC and the RFID reader in a long range communication so that the RFID tag IC enters the HF field (e.g. approaching the RFID tag IC with the RFID reader and/or approaching the RFID reader with the RFID tag);

iia) deciding that the available power is sufficient for writing to the non-volatile memory, if erasing an old counter value is successful; and/or iib) deciding that the available power is not sufficient for writing to the non-volatile memory, if erasing the old counter value is not successful.

In this manner, even though long range communication (and a slow approaching to the HF field) is used, it may be decided in an efficient and reliable manner, if the available power is sufficient. Thereby, the function of the whole communication system may be improved.

The aspects defined above and further aspects of the disclosure are apparent from the examples of embodiment to be described hereinafter and are explained with reference to these examples of embodiment. The disclosure will be described in more detail hereinafter with reference to examples of embodiment but to which the disclosure is not limited.

BRIEF DESCRIPTION OF THE DRAWINGS

FIG. 4 illustrates in detail an increment of a counter value in the RFID communication system according to an exemplary embodiment of the present disclosure.

FIGS. 5 to 7 respectively illustrate a method of operation an RFID communication system regarding sufficient power according to exemplary embodiments of the present disclosure.

The illustrations in the drawings are schematic. In different drawings, similar or identical elements are provided with the same reference signs.

DESCRIPTION OF EMBODIMENTS

Figure 1:
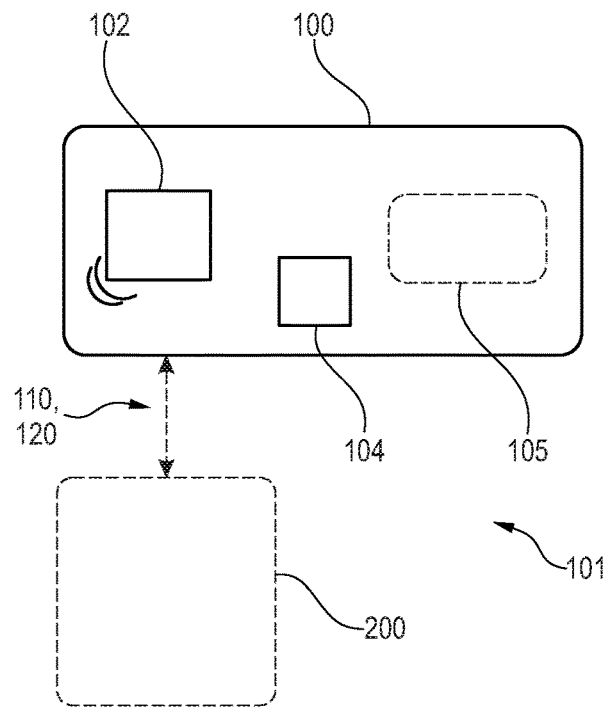
FIG. 1 illustrates an RFID communication system according to an exemplary embodiment of the present disclosure.

Before, referring to the drawings, embodiments will be described in further detail, some basic considerations will be summarized based on which embodiments of the disclosure have been developed.

According to an embodiment, an implementation is described which increments the counter value once at every read point. The maximum startup (power-up) time of 5 ms is enough to increment the counter value. Further, a method to handle a power level, which is sufficient for reading the RFID tag IC but not for writing the RFID tag IC, is described.

According to an exemplary embodiment, the only safe time to increment a non-volatile memory counter value in a T5T system is the tag startup (power-up) time of around 5 ms. To mimic an increment at the first memory read access (read command), a successful increment of the counter value is stored in an increment flag, e.g. a persistence bit (=a bit that keeps its state for a short time without being powered). This blocks a further increment of the counter value. At a further read command, this flag/bit is reset and the counter value will again be incremented at the next startup (power-up). This way the counter value is incremented once per read (cycle) even if there are small power outages or the RFID reader uses HF field resets during anti-collision. The counter value may also get incremented if the reader just powers the RFID tag IC and runs anti-collision. However, this is limited to a single increment and can be interesting in anti-fraud use cases, e.g. because the same counter value may indicate the tag was cloned.

According to an exemplary embodiment, a further problem solved is the difference between read and write operating range of an RFID tag. In classical NFC short range applications, this difference is a couple of millimeters, however, in long range systems used for logistics, it can be several centimeters. Unlike the classical NFC applications, there is no retry by a user or a typical speed for entering the HF field (in ISO 15693 standard). So, the RFID tag IC has to try and keep trying for some time to program (increment) the non-volatile memory to handle the case when the RFID tag IC is entering the HF field slowly compared to the write speed. This ensures that the tag is readable independent of the available power and there are only two cases: the counter value has been incremented successfully and the tag shows the correct value or incrementing the counter value was not successful and the RFID tag IC flags this error to the RFID reader infrastructure. For sensing whether the available power is sufficient to write to the non-volatile memory, directly the erase cycle of the non-volatile memory (in particular erasing step an old counter value) is used. This avoids the need for a current sink to probe whether enough power is available. This current sink would need to always sink more current than the memory needs, additionally increasing the minimum power needed by the tag.

According to a further exemplary embodiment, an RFID tag IC increments a non-volatile memory stored counter value automatically at startup when an "increment flag" is not set. The "incremented flag" survives short power outages and is reset at a read to the user memory (of the non-volatile memory). The increment at startup is retried for a limited number of times after a guard time which can be constant or dynamic. This ensures the RFID tag IC is readable when entering the HF field slowly with two well defined outcomes: counter value incremented or counter value not incremented. Sensing of the available power from the HF field is done directly with the non-volatile memory erase cycle.

FIG. 1 illustrates an exemplary embodiment of a communication system 101, according to the present disclosure, comprising an RFID tag IC 100 and an RFID device 200. The RFID tag IC 100 is NFC-enabled and comprises an NFC interface 102 with an antenna and a non-volatile memory 105 that stores a counter value. Furthermore, the RFID tag IC 100 comprises a processing unit 104 which is integrated with the memory 105 or can be a separate structure. The RFID device 200 is configured as a mobile NFC phone (and/or an RFID reader). The NFC interface 102 is configured to receive a request for a service (such as a read command) 120 from the RFID device 200. Furthermore, the NFC interface 102 is configured to provide a reply message 130 (e.g. in NDEF format) to the RFID device 200 in response to the request. Hereby, the RFID tag IC device 100 can be a part of a smart poster that offers a service and the user of the RFID device 200 can obtain a link to a service provider. The RFID device 200 is configured to switch on an HF field 110 into which the RFID tag IC enters (couples). Upon coupling with the HF field (and receiving power for operation), the processing unit 104 triggers a power-up 110 of the RFID tag IC 100.

Figure 2:
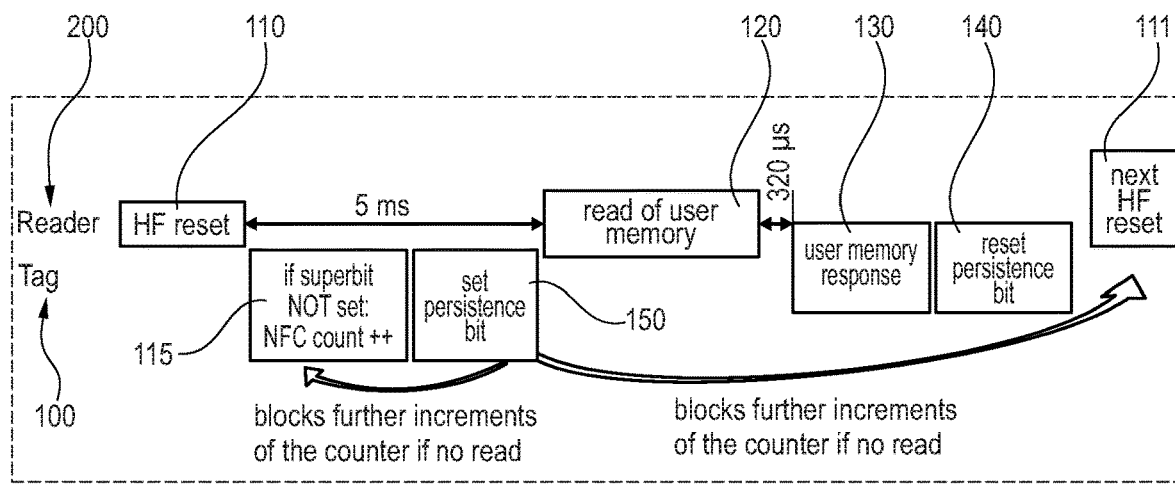
FIG. 2 illustrates a method of operating an RFID communication system according to an exemplary embodiment of the present disclosure.
Figure 3:
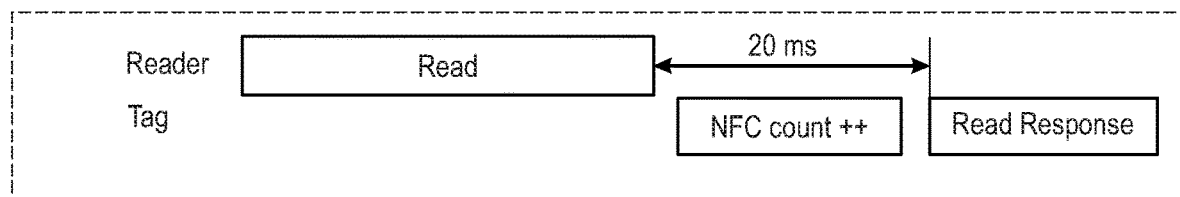
FIG. 3 illustrates a conventional example.

FIG. 2 illustrates an exemplary embodiment of a method of operating the communication system 101, according to the present disclosure, described in FIG. 1. In the first place, the RFID tag IC 100 couples with the HF field (HF reset), when the HF field is switched on or the RFID tag IC 100 enters the HF field, of the RFID device. Subsequently, a power-up of the RFID tag IC 100 is initiated. Since an increment flag 150 in form of a persistence bit is not set, the present counter value stored in the non-volatile memory 105 of the RFID IC tag 100 is incremented, when the RFID tag IC 100 is coupled (powered-up 110) to the HF field. The increment flag is now set, when the incrementing is successful, and thereby blocks a further increment of the counter value (until the next HF field coupling 111). Then, a read command 120 from the RFID device 200 is received at the RFID tag IC 100 and is fulfilled. Afterwards, the RFID tag IC 100 sends a reply 130 to the RF device 200. It can be seen that, due to the application of the ISO 15693 standard, the time between fulfilling the read command 120 and sending the reply 130 is only 320 µs, being too short to increment the counter value (which takes several milliseconds). Subsequently, the increment flag 150 is reset 140 and will be set again, when a further coupling with an HF field 111 (next HF reset) occurs.

FIG. 4 illustrates in detail an increment 115 of the counter value according to an exemplary embodiment of the present disclosure. The increment 115 is initiated by a power-up 110 of the RFID tag IC 100 and starts with a wait for sufficient supply voltage (from the HF field) step 161. If the supply voltage is sufficient (however, it can drop as soon as current consumption rises), an erase step 162 of the present (old) counter value is done. The erase step/cycle 162 is done in a way that it consumes more power than a subsequent increment (program) step/cycle 165, 166. If the erase step 162 fails, it is retried 163 within a retry loop 160. If a maximum number of retries 163 has not been reached, another retry 163 is started after a guard time 164. If the maximum number of retries 163 has been reached, the retry loop 160 is stopped 167 (e.g. the RFID tag IC reports the fail 167 to the RFID device (reader infrastructure) and can still be in long range communication). When the erase step 162 functions, the processing unit 104 continues with the increment steps 165, 166 (programming the data).

Figure 6:
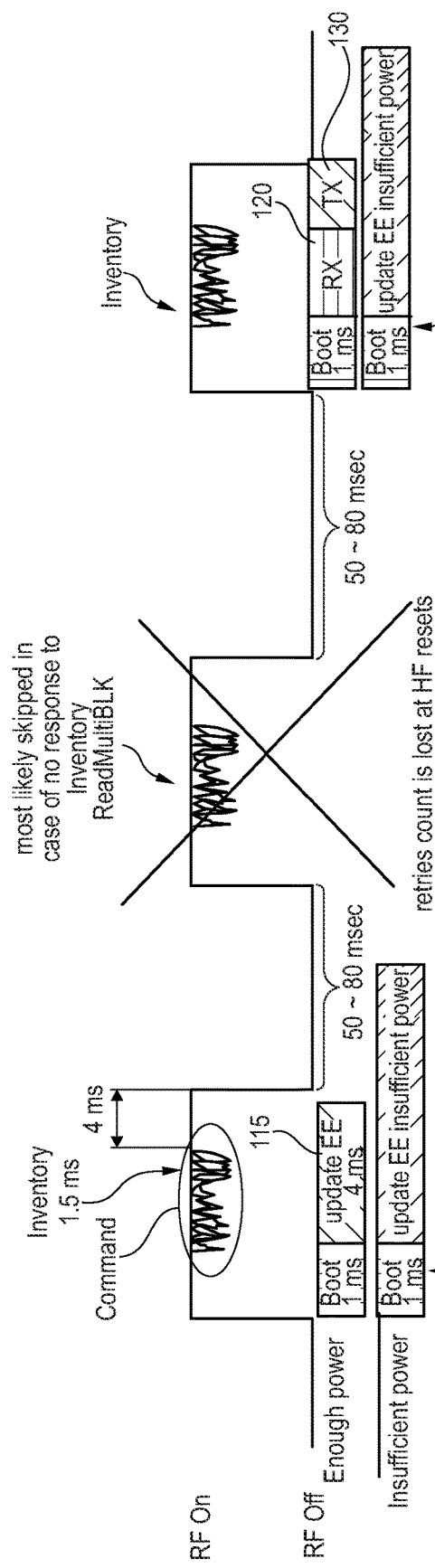
Figure 7:
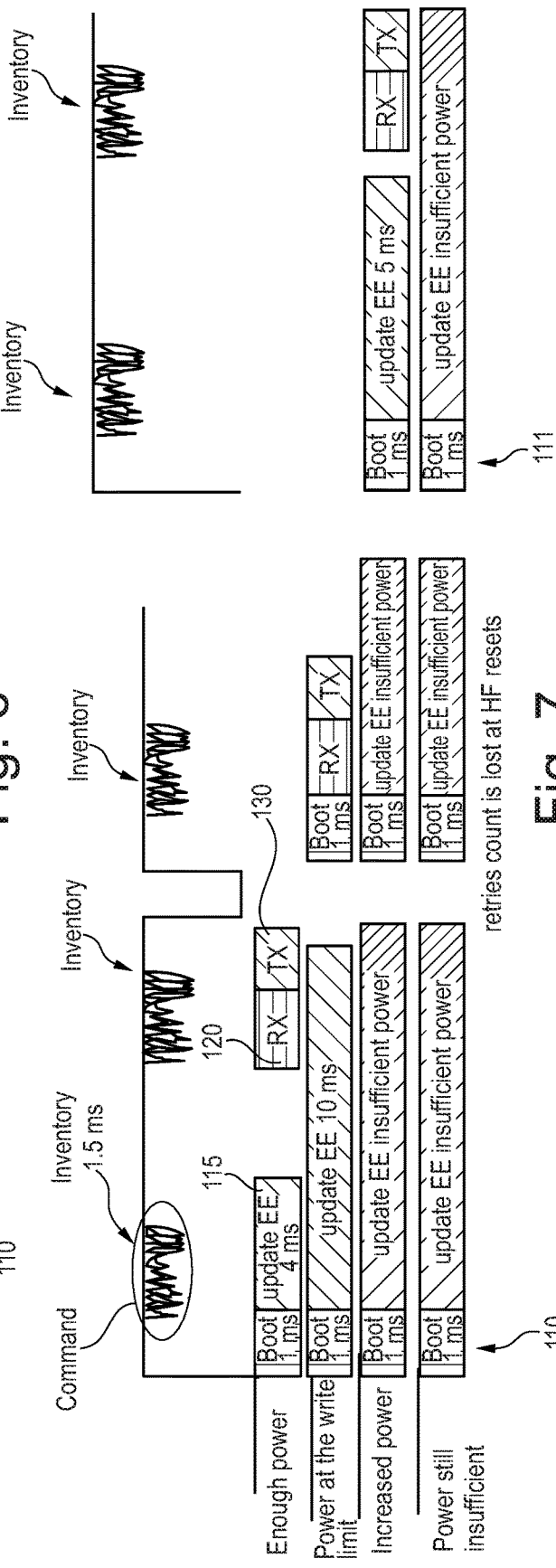

FIGS. 5 to 7 illustrate a respective operation of a communication system 101 with respect to power management according to exemplary embodiments of the present disclosure. FIG. 5: It can be seen that, in case of sufficient power 110 from the HF field, the counter value is incremented 115 and then, inventory command 120 and reply 130 are communicated. The increment 150 will take longer in case of power being at the write limit. If power supply is insufficient, many retries 163 are necessary until the increment 115 and the further steps 120, 130 can be fulfilled.

FIG. 6: In case of an HF reset (power-up) 110, the number of retires 163 is lost, and a new power-up 111 is initiated. Time between fail and new HF reset can be in between 50 and 80 milliseconds.

FIG. 7: In this case, a plurality of HF resets (power-ups) 110, 111 is applied but the command is repeated by the RFID reader in case it does not receive a response from the RFID tag.

In this specification, embodiments have been presented in terms of a selected set of details. However, a person of ordinary skill in the art would understand that many other embodiments may be practiced which include a different selected set of these details. It is intended that the following claims cover all possible embodiments.

REFERENCE NUMERALS

100 RFID tag IC, NFC tag
101 RFID communication system
102 NFC interface
104 Processing unit
105 Non-volatile memory
110 HF field coupling, power-up
111 Next power-up
115 Increment, set increment flag
120 Read command
130 Reply message
140 Reset increment flag
150 Increment flag
160 Retry loop
161 Wait for sufficient power
162 Erase step
163 Retry step
164 Guard time
165, 166 Increment step
167 Fail, terminate
200 RFID device

The invention claimed is:

1. A radio frequency identification (RFID) tag integrated circuit (IC), comprising:
   a near field communication (NFC) interface configured to initiate a power-up, when coupled with an high frequency (HF) field, and receive a read command from an RFID device;
   a non-volatile memory, wherein the non-volatile memory is configured to store a counter value; and
   a processing unit configured to increment the counter value when coupled with the HF field, set an increment flag, when the increment is successful, and thereby block a further increment of the counter value, and reset the increment flag after fulfilling the read command.

2. The RFID tag IC according to claim 1, wherein the RFID tag IC is configured according to the ISO15693 standard.

3. The RFID tag IC according to claim 2, wherein a time slot between receiving the read command and transmitting a reply message to the NFC device is less than 1 millisecond.

4. The RFID tag IC according to claim 1, wherein the RFID tag IC is configured according to the NFC T5T standard.

5. The RFID tag IC according to claim 1, wherein the available power-up time for the RFID tag IC is 5 millisecond or more.

6. The RFID tag IC according to claim 1, wherein the increment flag is a persistence bit or a non-volatile bit.

7. The RFID tag IC according to claim 1, wherein the processing unit is further configured to decide whether available power from the HF-field is sufficient for incrementing the counter value or not.

8. The RFID tag IC according to claim 1, wherein the processing unit is further configured to, in case available power from the HF field is not sufficient to increment the counter value, retry incrementing the counter value.

9. The RFID tag IC according to claim 8, wherein a first access to the non-volatile memory step of a multiple-step access to the non-volatile memory requires more power than the subsequent access to the non-volatile memory step, wherein the processing unit is further configured for at least one of:

if the first access to the non-volatile memory step is not successful, retry after a guard time until a maximum number of retries is reached;

if the first access to the non-volatile memory step is successful, start the subsequent access to the non-volatile memory step.

10. The RFID tag IC according to claim 8, wherein the processing unit is further configured to:

perform a retry loop, including using a static or a progressive guard time, when the increment of the counter value is not successful due to insufficient available power from the HF field.

11. An RFID communication system, comprising:

an RFID tag IC according to claim 1; and the RFID device configured to switch on the HF field and send the read command to the RFID tag IC.

12. The communication system according to claim 11, wherein the RFID device is configured as an NFC device or an RFID reader.

13. The communication system according to claim 11, wherein the RFID tag IC and the RFID device are in long range communication.

14. The communication system according to claim 11, wherein the communication system is configured for incrementing the counter value, when the HF field of the RFID device is on and the RFID tag IC is entering the HF field.

15. A method of managing a radio frequency identification (RFID) communication system including an RFID tag integrated circuit (IC) and an RFID device, the method comprising:

coupling the RFID tag IC with a high frequency (HF) field of the RFID device, and subsequently initiating a power-up of the RFID tag IC;

receiving a read command from the RFID device at the RFID tag IC;

incrementing a counter value stored in a non-volatile memory of the RFID tag, when coupled to the HF field;

setting an increment flag, when the incrementing is successful, and thereby blocking a further increment of the counter value;

fulfilling the read command, and subsequently resetting the increment flag.

16. The method according to claim 15, wherein the RFID device is configured as an RFID reader, the method further comprising:

approaching the RFID tag IC and the RFID reader in a long range communication so that the RFID tag IC enters the HF field;

deciding that the available power is sufficient for writing to the non-volatile memory, if erasing an old counter value is successful;

deciding that the available power is not sufficient for writing to the non-volatile memory, if erasing the old counter value is not successful.

* * * * *